United States Patent
Gross et al.

(10) Patent No.: US 12,120,663 B2
(45) Date of Patent: Oct. 15, 2024

(54) METHOD OF OPERATING A COMMUNICATION SYSTEM

(71) Applicant: R3—RELIABLE REALTIME RADIO COMMUNICATIONS GMBH, Berlin (DE)

(72) Inventors: James Gross, Stockholm (DE); Christian Dombrowski, Berlin (DE); Dominik Chmiel, Berlin (DE)

(73) Assignee: R3—RELIABLE REALTIME RADIO COMMUNICATIONS GMBH, Berlin (DE)

( * ) Notice: Subject to any disclaimer, the term of this patent is extended or adjusted under 35 U.S.C. 154(b) by 475 days.

(21) Appl. No.: 17/433,432

(22) PCT Filed: Feb. 14, 2020

(86) PCT No.: PCT/EP2020/053889
§ 371 (c)(1),
(2) Date: Aug. 24, 2021

(87) PCT Pub. No.: WO2020/173718
PCT Pub. Date: Sep. 3, 2020

(65) Prior Publication Data
US 2022/0167377 A1    May 26, 2022

(30) Foreign Application Priority Data
Feb. 28, 2019 (EP) .................................... 19160020

(51) Int. Cl.
*H04W 72/1263* (2023.01)
*H04L 1/08* (2006.01)
(Continued)

(52) U.S. Cl.
CPC .......... *H04W 72/1263* (2013.01); *H04L 1/08* (2013.01); *H04W 72/0446* (2013.01); *H04W 72/20* (2023.01); *H04W 72/542* (2023.01)

(58) Field of Classification Search
None
See application file for complete search history.

(56) References Cited

U.S. PATENT DOCUMENTS

| | | | |
|---|---|---|---|
| 7,133,396 B1 | 11/2006 | Schmidl et al. | |
| 7,190,686 B1 * | 3/2007 | Beals ................... | H04B 7/2687 370/347 |

(Continued)

FOREIGN PATENT DOCUMENTS

| | | |
|---|---|---|
| JP | 2001-285315 A | 10/2012 |
| WO | 2011/106931 A1 | 9/2011 |
| WO | 2017/157663 A1 | 9/2017 |

OTHER PUBLICATIONS

Extended European Search Report dated Aug. 21, 2019 issued by the European Patent Office in related European Patent Application No. 19160020.4; filed Feb. 28, 2019.
(Continued)

*Primary Examiner* — Saumit Shah
(74) *Attorney, Agent, or Firm* — Gordon Rees Scully & Mansukhani, LLP

(57) ABSTRACT

An embodiment of the invention relates to a method of operating a communication system that comprises a master node (MN) and at least two slave nodes (SN1-SN4) and is operated in a time-division multiplexing technique. A transmission subframe (TSF) comprises at least one downlink slot (DS) for transmission of downlink data packets (DDP) from the master node (MN) to the slave nodes (SN1-SN4), and at least one uplink slot (US1-US4) for transmission of uplink data packets (UDP) from each of the slave nodes (SN1-SN4) to the master node (MN). The master node (MN)
(Continued)

evaluates the uplink data packets (UDP) and generates a re-transmission schedule (RTS) that defines a re-transmission of uplink and/or downlink data packets (UDP, DDP) in the auxiliary subframe (ASF). Prior to the re-transmission of uplink and/or downlink data packets (UDP, DDP) in the auxiliary subframe (ASF), the master node (MN) broadcasts the re-transmission schedule (RTS) to the slave nodes (SN1-SN4).

14 Claims, 6 Drawing Sheets

(51) Int. Cl.
*H04W 72/0446* (2023.01)
*H04W 72/20* (2023.01)
*H04W 72/542* (2023.01)

(56) References Cited

U.S. PATENT DOCUMENTS

| | | | |
|---|---|---|---|
| 2013/0021948 A1* | 1/2013 | Moulsley | H04W 72/20 370/254 |
| 2014/0010175 A1 | 1/2014 | Chiu | |
| 2015/0117300 A1 | 4/2015 | Nam et al. | |
| 2018/0124783 A1* | 5/2018 | Mukkavilli | H04W 72/0446 |
| 2020/0036483 A1* | 1/2020 | Aijaz | H04L 1/1874 |

OTHER PUBLICATIONS

International Search Report and Written Opinion dated May 14, 2020 issued in a related International Patent Application No. PCT/EP2020/053889; filed Feb. 14, 2020.

Japanese Office Action issued in corresponding Japanese Patent Application No. 2021-549358.

* cited by examiner

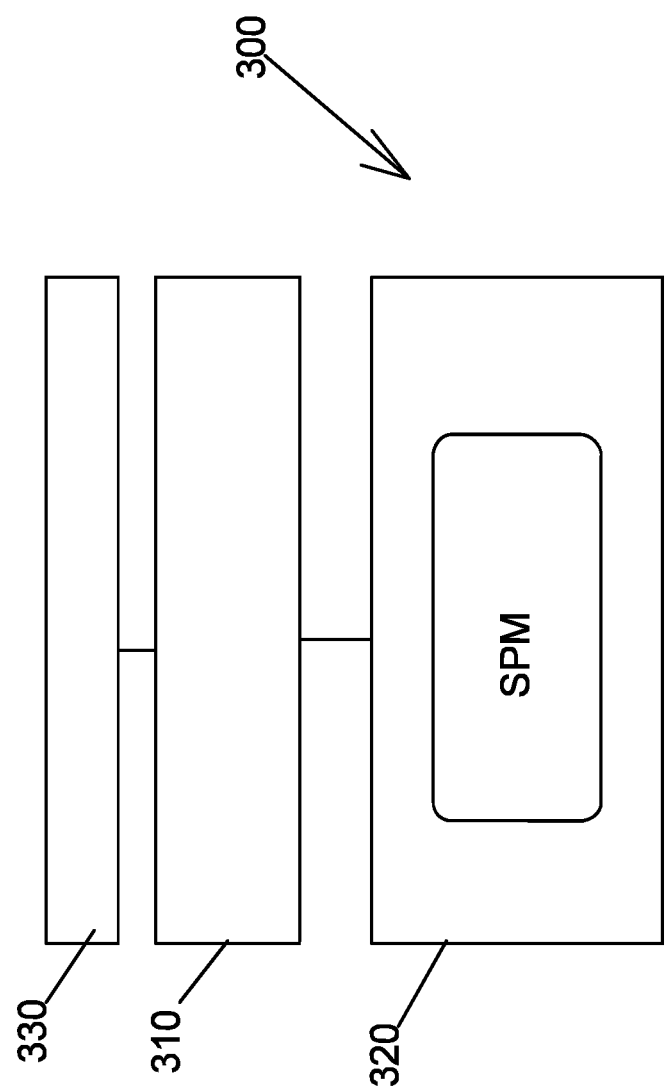

METHOD OF OPERATING A COMMUNICATION SYSTEM

The invention relates to methods of operating a communication system in a time-division multiplexing technique as well as to communication nodes that are configured to be operated accordingly.

BACKGROUND OF THE INVENTION

For communication systems that need to provide reliable data transmissions, employing automatic repeat request (so-called ARQ) of transmitted data is a standard approach. The typical implementation ensures here that after the original transmission, the receiver acknowledges the correct reception of the packet. If this acknowledgement is not received by the initial transmitter within a given time span, the transmitter repeats the transmission of the data packet assuming that the receiver has not correctly decoded the packet. This also implies the use of a timer at the transmitter, which upon expiration triggers the re-transmission. A simplified version of this mechanism is the expectation at the transmitter to receive right away an acknowledgement, and otherwise repeat the transmitted data up to a certain amount of times (maximum re-transmission count).

In the context of an ultra-reliable data transmission, in particular in wireless systems, the major approach to realize very high degrees of reliability is to exploit diversity, i.e. the fact that despite the random variations of the wireless channel, this random state is statistically independent in different dimensions of the channel (time, frequency, space, multiple terminals) and thus, the transmission over multiple of these instances of the wireless channel of the same data increases drastically the reception reliability. Still, ARQ will be an essential part of future system implementations due to the uncertainty of wireless channel qualities in general, and the high degree of different transmission environments that such ultra-reliable wireless systems will be deployed in. However, an key question relates to the efficient implementation of ARQ.

The international patent application WO 2017/157663 A1 discloses a method of operating a communication system that comprises at least four communication nodes. The communication system is operated in a time-division multiplexing technique wherein the communication is carried out in consecutive time frames which are divided into slots. At least one slot is allocated to each of the communication nodes. Each of the slots comprises, or preferably consists of, at least two consecutive sub-slots. Echo signals are transmitted during echo sub-slots.

OBJECTIVE OF THE PRESENT INVENTION

An objective of the present invention is to provide a very reliable method for operating a communication system.

A further objective of the present invention is to provide an improved communication node with regard to a reliable communication.

BRIEF SUMMARY OF THE INVENTION

An embodiment of the present invention relates to a method of operating a communication system that comprises a master node and at least two slave nodes and is operated in a time-division multiplexing technique. The method is characterized in that the communication is carried out in consecutive time frames, which each comprise at least one transmission subframe and at least one auxiliary subframe which is scheduled after the transmission subframe. The transmission subframe comprises at least one downlink slot for transmission of downlink data packets from the master node to the slave nodes, and at least one uplink slot for transmission of uplink data packets from each of the slave nodes to the master node. The master node sends downlink data packets to all or at least a subset of the slave nodes during the downlink slot, and each of the slave nodes sends at least one uplink data packet to the master node during its respective uplink slot. The master node evaluates the uplink data packets that were received from the slave nodes during the uplink slots of the transmission subframe, and generates a re-transmission schedule that defines a re-transmission of uplink and/or downlink data packets in the auxiliary subframe in case of an unsuccessful reception of due uplink data packets from slave nodes in the respective uplink slot or in case that uplink data packets received from the slave nodes indicate an unsuccessful reception of downlink data packets during the previous downlink slot. Prior to the first re-transmission of uplink and/or downlink data packets in the auxiliary subframe, the master node broadcasts the re-transmission schedule to the slave nodes.

The master node preferably broadcasts the re-transmission schedule in a control packet between the transmission subframe and the auxiliary subframe.

The re-transmission schedule may define at least one slave node that is requested to re-transmit the re-transmission schedule or the control packet before the beginning of or during the auxiliary subframe.

In case of a successful reception of data packets from the master node in the downlink slot, each slave node preferably confirms this successful reception in its consecutive uplink slot.

In case of an unsuccessful reception of a downlink data packet with respect to any of the slave nodes, the re-transmission schedule may indicate that the master node itself re-transmits the respective downlink data packet to the affected slave node.

Each of the slave nodes preferably store all uplink and downlink data packets that they receive during the transmission subframe, including those data packets that are assigned to other slave nodes or sent from other slave nodes to the master node.

In case of an unsuccessful reception of a downlink data packet with respect to any of the slave nodes, the re-transmission schedule may request one or more of the other slave nodes to re-transmit the respective stored downlink data packet.

In case of an unsuccessful reception of an uplink data packet with respect to any of the slave nodes, the re-transmission schedule may request one or more of the other slave nodes to re-transmit the respective stored uplink data packet.

The selection of said one or more of the other slave nodes that are requested to re-transmit stored data packets, may be arbitrary or carried out according to a given selection scheme that is independent of channel quality data.

However, according to a preferred embodiment, the master node preferably selects said one or more of the other slave nodes that are requested to re-transmit their stored data packets, in dependence of channel quality data.

Each of the slave nodes may determine channel quality data with respect to data packets received from each of the other slave nodes as well as from the master node, and transmit the quality data to the master node during its uplink slot.

In case of an unsuccessful reception of an uplink data packet during an uplink slot of one of the slave nodes, hereinafter referred to as affected uplink slave node, the master node may request at least one of the other slave nodes, hereinafter referred to as uplink re-transmitting slave node, to re-transmit their respective stored uplink data packet, wherein the master node may select the slave node that has the best channel quality data with respect to the reception of data packets from the master node, as the or one of the uplink re-transmitting slave nodes.

In case of an unsuccessful reception of a downlink data packet during the downlink slot with respect to one of the slave nodes, hereinafter referred to as affected downlink slave node, the master node may request at least one of the other slave nodes, hereinafter referred to as downlink re-transmitting slave node, to re-transmit their stored data packet of the respective downlink slot, wherein the master node may select at least the slave node that has the best channel quality data with respect to the reception of data packets from the affected node, as the or one of the downlink re-transmitting slave node.

Based on one or more previous time frames, the master node preferably re-arranges the allocation of slave nodes to the uplink slots in the transmission subframe, wherein slave nodes having better channel quality data with respect to the reception of data packets from the master node are scheduled after slave nodes with worse channel quality data.

In case of an unsuccessful reception during the uplink and downlink slot with respect to one of the slave nodes, hereinafter referred to as affected slave node, the master node may determine at least one of the other slave nodes, hereinafter referred to as elected slave node, that has received and stored the data packets of both the downlink slot and uplink slot of the affected slave node, and may request the elected slave node within the re-transmission schedule to re-transmit the stored data packets of the respective downlink slot and uplink slot of the affected slave node. After reception of the re-transmission schedule, the elected slave node may generate a network-coded data packet based on the data packets of the downlink and uplink slot of the affected slave node. The network coding is preferably carried out based on a coding scheme that allows decoding the coded data on the basis of the data packet or packets of the uplink slot as well as on the basis of the data packet or packets of the downlink slot. The elected slave may broadcast the network-coded data according to the re-transmission schedule.

The elected slave node preferably generates the network-coded data by applying an XOR-operation to the data packets of the downlink and uplink slot of the affected slave node.

Based on one or more previous time frames, the master node may predict the number of slots that need to be re-transmitted in an upcoming time frame, e.g. in the next time frame, adapt the length of the auxiliary subframe of said upcoming time frame according to this prediction, and inform the slave nodes about the adapted length of the auxiliary subframe at least prior to the beginning of the auxiliary subframe of the respective time frame.

Alternatively or additionally, the master node may predict the number of slots that need to be re-transmitted in the consecutive auxiliary subframe, during the ongoing transmission subframe, adapt the length of the auxiliary subframe according to this prediction, and inform the slave nodes about the adapted length of the auxiliary subframe at least prior to the beginning of the auxiliary subframe of the respective time frame.

Slots of the auxiliary time frame that are not used for a re-transmission are preferably filled with best effort data.

A further embodiment of the invention relates to a communication node configured to be part of a communication system that comprises a master node and at least two slave nodes. The communication node is preferably configured to operate either as master node or as slave node as described above.

The communication node preferably comprises a processor and a memory. The memory stores a software module. The software module is configured such that the communication node operates either as master or slave node when the processor executes the software module.

Aspects of the above embodiments of the present invention are based on the assessment that ultra-reliable wireless systems can be expected to operate all their payload transmissions at relatively high reliability levels (exploiting diversity), such that out of N transmission attempts for N different stations, only a small fraction of stations will have to be re-transmitted.

Nevertheless, in a traditional implementation these re-transmissions would be dealt with one-by-one, and in particular in a TDMA frame it would be required to account for the re-transmission for each transmitted payload packet individually (i.e. for each transmission slot, at least one re-transmission slot needs to be planned for). However, in an ultra-reliable wireless system, most of these preallocated re-transmissions are not required, as the initial transmission are typically quite reliable.

The exemplary embodiments of the present invention as described above therefore relate to ways how to increase the efficiency of such ultra-reliable wireless communication systems. The main idea here is to consider the re-transmissions not individually, but over a group of nodes which are all allocated with their transmissions (down-link as well as up-link) in a TDM, e.g. TDMA, time frame. Then, ultra-reliability can still be preserved if only for a subset of these nodes re-transmission slots are reserved, which nevertheless are allocated dynamically towards the end of a transmission subframe. To give an example, let us assume N=10, and packet transmissions happen with a PER of $10^{-3}$ while a single packet transmission would require 50 microseconds. We only focus on the uplink direction for illustration purposes. If re-transmissions need to be accounted for individually, this means that in a scheduled TDMA system, after each initial transmission slot a re-transmission slot needs to be planned for, such that N=10 transmissions require at least 1 ms (not accounting for packet processing and ACK frames) as for each payload packet two transmission attempts need to be planned. However, due to the low packet error probability most of these re-transmission slots will not be required.

This is different if the re-transmissions are considered over the entire set of nodes N. In this case, with N initial transmission attempts on average only $N*10^3$ re-transmissions will be required, which equals in above example only one re-transmission every 100 TDMA frames. Thus, by reserving at the end of the frame 2 or 3 re-transmission slots, very high reliabilities can be achieved if a central node (the access point or master) dynamically organizes the re-transmissions. Such a frame design hence leads to a higher capacity that can be achieved as the 7 saved slots for re-transmissions (in comparison to the approach where re-transmissions are organized individually) can be given to seven new nodes to realize initial transmissions (i.e. expanding N from 10 to 17 without a significant loss in overall reliability).

Such a dynamic organization of the packet re-transmissions by a master has further advantages. For instance, this organization allows to exploit instantaneous channel state information in the organization of the re-transmissions. To see this, assume in the above example that during each uplink transmission all N nodes actively try to decode the transmitted packet, regardless of the fact that the transmitted packet is destined for the master. In addition, each station tracks the channel state from the transmitting station to itself, which is also done by the master (i.e. it tracks the channel state of the transmitting station). When it is the turn of some node n to transmit it's payload to the master, this station then appends the successful reception of all previous n−1 transmissions to the payload packet, while also appending the measured n−1 channel states. Given this information, the efficiency of the dynamic re-transmission phase can thus be increased as the master knows to some degree which other stations correctly received some of the transmitted payload packets, and how good their wireless channel states are (among each other as well as towards the master). Therefore, instead of dynamically scheduling the re-transmission from the original node of the corresponding payload, the master can schedule the re-transmission to be performed by an intermediate node that received the payload correctly, and which has a better channel state towards the master. In many cases this can drastically increase the reliability of the system, in comparison to re-transmissions being conducted by the original nodes, such that even less re-transmission slots at the end of the TDMA frame need to be reserved.

BRIEF DESCRIPTION OF THE DRAWINGS

In order that the manner in which the above-recited and other advantages of the invention are obtained will be readily understood, a more particular description of the invention briefly described above will be rendered by reference to specific embodiments thereof which are illustrated in the appended drawings. Understanding that these drawings depict only typical embodiments of the invention and are therefore not to be considered to be limiting of its scope, the invention will be described and explained with additional specificity and detail by the use of the accompanying drawings in which

FIG. 6 shows an exemplary embodiment of communication node according to the present invention.

DETAILED DESCRIPTION OF THE PREFERRED EMBODIMENTS

The preferred embodiments of the present invention will be best understood by reference to the drawings. It will be readily understood that the present invention, as generally described and illustrated in the figures herein, could vary in a wide range. Thus, the following more detailed description of the exemplary embodiments of the present invention, as represented in the figures, is not intended to limit the scope of the invention, as claimed, but is merely representative of presently preferred embodiments of the invention.

Figure 1:
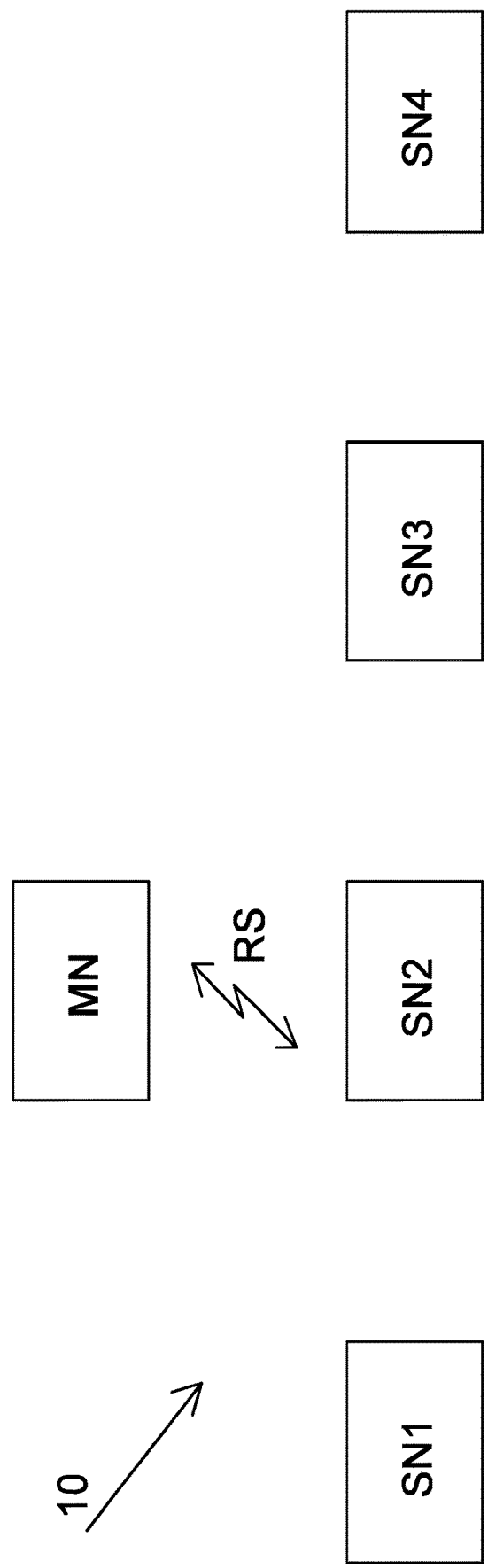
FIG. 1 illustrates an exemplary embodiment of a communication system according the present invention.

FIG. 1 shows an exemplary embodiment of a communication system 10 according to the present invention. The communication system 10 comprises a master node MN and a plurality of slave nodes SN1-SN4, for instance four slave nodes SN1-SN4 as shown in FIG. 1. The master node MN communicates with the slave nodes SN1-SN4 preferably via radio signals RS.

The communication system is operated in a time-division multiplexing technique wherein the communication is carried out in consecutive time frames F. A first exemplary embodiment of a time frame F is depicted in FIG. 2.

The time frame F comprises a transmission subframe TSF, an auxiliary subframe ASF and a control slot Sjsp for transmitting a control packet JSP. The auxiliary subframe ASF comprises two re-transmission slots RT and is scheduled after the transmission subframe TSF. The control slot Sjsp is scheduled between the transmission subframe TSF and the auxiliary subframe ASF.

Figure 2:
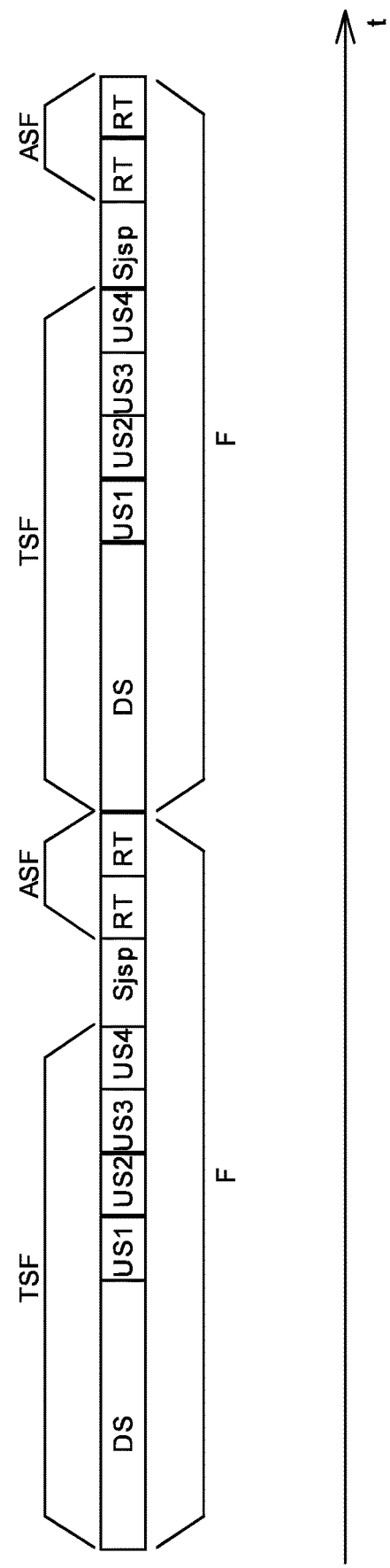
FIG. 2 illustrates a first exemplary embodiment of time frames for operating the system of FIG. 1.

The transmission subframe TSF of FIG. 2 comprises a downlink slot DS for transmission of downlink data packets DDP (see step 100 in FIG. 3) from the master node MN to the slave nodes SN1-SN4, and uplink slots US1-US4 for transmission of uplink data packets UDP (see step 110 in FIG. 3) from each of the slave nodes SN1-SN4 to the master node MN. In FIG. 2, the uplink slot US1 is assigned to the slave node SN1, the uplink slot US2 is assigned to the slave node SN2, the uplink slot US3 is assigned to the slave node SN3, and the uplink slots US4 is assigned to the slave node SN4.

Figure 3:
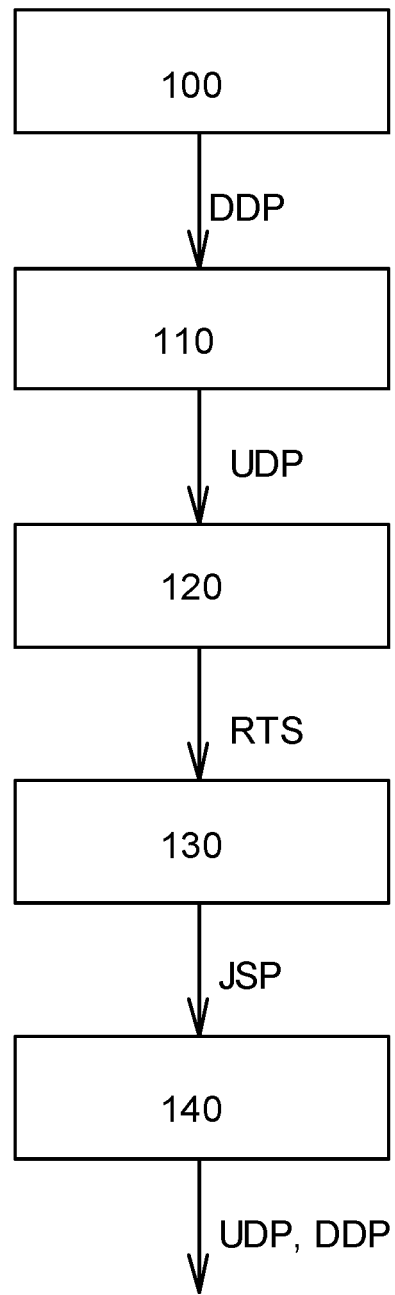
FIG. 3 shows a flowchart illustrating a first exemplary embodiment of a method for operating the system of FIG. 1 based on the time frames of FIG. 2.

The communication system of FIG. 1 may be operated as shown in the flowchart of FIG. 3:

During the downlink slot DS, the master node MN sends downlink data packets DDP to all or at least a subset of the slave nodes SN1-SN4 (see step 100 in FIG. 3).

Afterwards, each slave node SN1-SN4 sends at least one uplink data packet UDP to the master node MN during its respective uplink slot US1-US4 (see step 110 in FIG. 3).

In case of a successful reception of downlink data packets DDP from the master node MN in the previous downlink slot DS, the uplink data packets UDP sent by the slave nodes confirm this successful reception. In case of no reception at all or an unsuccessful reception (e.g. if received data packets could not be decoded), the slave nodes SN1-SN4 report the missing or failed transmission in their respective uplink data packets UDP.

The slave nodes SN1-SN4 preferably store all the downlink data packets DDP as well as all uplink data packets UDP that they receive during the transmission subframe TSF, including those data packets that are assigned to other slave nodes or sent from other slave nodes to the master node MN.

In step 110, the slave nodes SN1-SN4 preferably inform the master node MN about all received and stored data packets. As will be explained further below, the information regarding stored data packets allows the master node to schedule an indirect re-transmission of data packets through intermediate slave nodes.

Furthermore, the slave nodes SN1-SN4 preferably determine channel quality data with respect to data packets UDP and DDP received from the other nodes. In step 110, the slave nodes preferably transmit the quality data to the master node MN. As will be explained further below, the information regarding channel quality data allows the master node to determine the most suitable intermediate slave nodes for an indirect re-transmission of data packets.

The master node MN evaluates the received uplink data packets UDP in step 120.

In case of an unsuccessful reception of due uplink data packets UDP from slave nodes SN1-SN4 in the respective uplink slot US1-US4 or in case that uplink data packets UDP indicate an unsuccessful reception of downlink data packets DDP during the previous downlink slot DS, the master node MN generates a re-transmission schedule RTS that defines a re-transmission of uplink data packets UDP and/or downlink data packets DDP in the upcoming auxiliary subframe ASF.

In step 130, the master node MN broadcasts the re-transmission schedule RTS to the slave nodes SN1-SN4. The re-transmission schedule RTS is incorporated in the control packet JSP and sent during the control slot Sjsp.

The re-transmission schedule is preferably generated in dependence of the channel quality data that the slave nodes have transmitted to the master node. More specifically, the re-transmission schedule is preferably generated as follows:

a) In case of an unsuccessful reception of an uplink data packet UDP during an uplink slot US1-US4 of one of the slave nodes SN1-SN4, hereinafter referred to as affected uplink slave node, the master node MN may determine at least one of the other slave nodes, hereinafter referred to as uplink re-transmitting slave node, to re-transmit their respective stored uplink data packet UDP of the affected uplink slave node. The master node MN preferably selects the slave node that has the best channel quality data with respect to the reception of the affected uplink data packets by the master node MN, as the or one of the uplink re-transmitting slave nodes.

b) In case of an unsuccessful reception of a downlink data packet DDP during the downlink slot DS with respect to one of the slave nodes SN1-SN4, hereinafter referred to as affected downlink slave node, the master node MN may determine at least one of the other slave nodes, hereinafter referred to as downlink re-transmitting slave node, to re-transmit their stored data packet of the respective downlink slot DS regarding the affected downlink data packets. The master node MN preferably selects at least the slave node that has the best channel quality data with respect to the reception of the affected downlink data packets by the affected node, as the or one of the downlink re-transmitting slave node.

c) In case of an unsuccessful reception during the uplink and downlink slot with respect to one of the slave nodes, hereinafter referred to as doubly-affected slave node, the master node MN preferably determines at least one of the other slave nodes SN1-SN4, hereinafter referred to as elected slave node, that has received and stored the data packets of both the downlink slot DS and the uplink slot of the doubly-affected slave node. The master node MN can easily determine a suitable slave node because the slave nodes report the stored data packets—as discussed above—during the uplink slots.

d) Additionally or alternatively, a re-transmission can also be carried out by the master node MN itself or directly by the affected slave node, for instance if the channel quality data recommend a direct re-transmission of data packets without involvement of intermediate slave nodes.

In step 140 the slave nodes that have been appointed for a re-transmission, re-transmit downlink and uplink data packets in the re-transmission slots RT according to the re-transmission schedule as defined in the control packet JSP.

In case of a doubly-affected slave node, the elected slave node preferably generates a network-coded data packet based on the data packets of both the downlink slot DS and the uplink slot of the affected slave node. The network coding is preferably carried out based on a coding scheme that allows decoding the coded data on the basis of the data packet or packets of the uplink slot as well as on the basis of the data packet or packets of the downlink slot DS. The elected slave node may generate the network-coded data by applying an XOR-operation to the data packets of the downlink slot and the uplink slot of the affected slave node. The elected slave node then broadcasts the network-coded data according to the re-transmission schedule.

The length of the time frame F, the length of the transmission subframe TSF, the length of the auxiliary subframe ASF (e.g. the number of re-transmission slots RT) and the length of the control slot Sjsp is preferably constant in order to allow the nodes to synchronize their transmission relative to one another and transmit their data during the appropriate slots and at the appropriate moment in time.

In the exemplary embodiment of FIGS. 2 and 3, the auxiliary subframe ASF comprises two re-transmission slots RT. In case that the master node MN recognizes that only one re-transmission slot RT would be sufficient or more than two re-transmission slot RT are necessary, the master node may modify the length of the auxiliary subframe ASF and the number of re-transmission slots RT.

To this end, the master node MN may evaluate one or more previous time frames F and adjust the number of re-transmission slots. For instance, the master node MN may predict the number of slots that need to be re-transmitted in an upcoming time frame F, e.g. in the next time frame F, adapt the length of the auxiliary subframe ASF of said upcoming time frame F according to this prediction, and inform the slave nodes SN1-SN4 about the adapted length of the auxiliary subframe ASF. The information is transmitted preferably at least prior to the beginning of the following time frame F.

Alternatively or additionally the master node MN may predict the number of slots that need to be re-transmitted during the ongoing transmission subframe TSF. In this case, the information regarding the length of the auxiliary subframe ASF should be transmitted at least prior to the beginning of the auxiliary subframe ASF of the respective time frame F.

Furthermore, the master node MN may re-arrange the allocation of slave nodes SN1-SN4 to the uplink slots US1-US4 in the transmission subframe TSF. Preferably slave nodes SN1-SN4 having better channel quality data with respect to the reception of data packets from the master node MN are scheduled after slave nodes SN1-SN4 with worse channel quality data. The master node may inform the new allocation during its downlink slot DS. If the master node groups better nodes (with respect to the channel quality data) after worse nodes (with respect to the channel quality data), the likelihood increases that slave nodes may be able to re-transmit data from other slave nodes.

Figure 4:
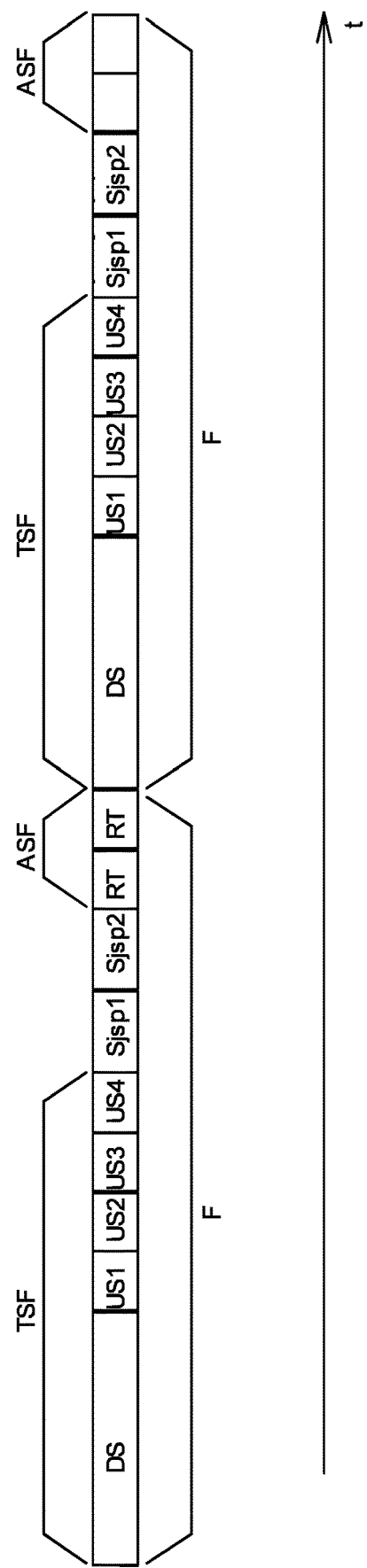
FIG. 4 illustrates a second exemplary embodiment of time frames for operating the system of FIG. 1.

FIG. 4 shows a second exemplary embodiment of a time frame F that is suitable for the operation of a communication system according to the present invention.

The time frame F of FIG. 4 comprises two control slots Sjsp1 and Sjsp2. Both control slots are scheduled between the transmission subframe TSF and the auxiliary subframe ASF.

In the first control slots Sjsp1, the master node broadcasts the control packet JSP and publishes the re-transmission schedule RTS as explained above with reference to FIGS.

1-3. In addition, the control packet JSP defines at least one slave node, hereinafter referred to as repeater node, that is requested to re-transmit the re-transmission schedule RTS or the entire control packet in the second control slot Sjsp2. The re-transmission of the re-transmission schedule RTS or the entire control packet JSP increases the likelihood that all slave nodes receive the re-transmission schedule RTS.

The master node MN may determine the repeater node or one of the repeater nodes as follows: First, the master node determines the slave node that has the worst connection with the master node (e.g. based on the known channel quality data). The slave node that has the best connection with the latter slave node, is then selected as the repeating node.

Figure 5:
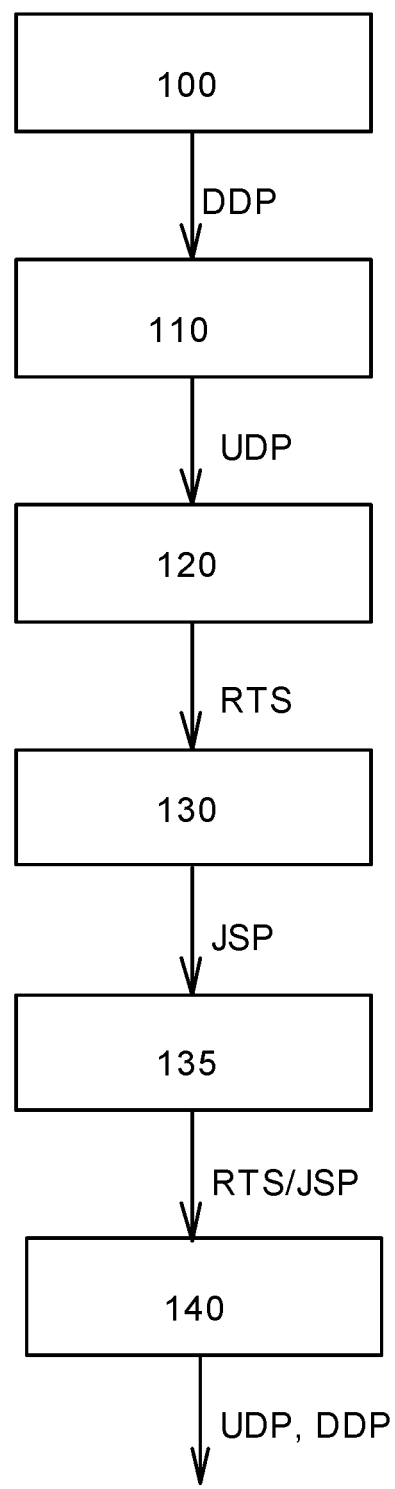
FIG. 5 shows a flowchart illustrating a second exemplary embodiment of a method for operating the system of FIG. 1 based on the time frames of FIG. 4.

In the second control slot Sjsp2, the re-transmission of the re-transmission schedule RTS or the entire control packet JSP (see step 135 in FIG. 5) is then carried out by the repeater slave node(s) that are identified in the control packet JSP.

In case that not all slots RT in the auxiliary subframe ASF are required for a re-transmission, the spare slots may be filled with best effort data.

FIG. 6 shows an exemplary embodiment of communication node 300 according to the present invention. The communication node 300 comprises a processor 310, a memory 320, and a transceiver 330 that is controlled by the processor 310. The memory 320 stores a software module SPM. The software module SPM is configured such that the communication node 300 operates either as master or slave node when the processor 310 executes the software module SPM.

The invention claimed is:

1. Method of operating a communication system that comprises a master node (MN) and at least two slave nodes (SN1-SN4) and is operated in a time-division multiplexing technique, characterized in that the communication is carried out in consecutive time frames, which each comprise at least one transmission subframe (TSF) and at least one auxiliary subframe (ASF) which is scheduled after the transmission subframe (TSF), wherein the transmission subframe (TSF) comprises at least one downlink slot (DS) for transmission of downlink data packets (DDP) from the master node (MN) to the slave nodes (SN1-SN4), and at least one uplink slot (US1-US4) for transmission of uplink data packets (UDP) from each of the slave nodes (SN1-SN4) to the master node (MN), wherein the master node (MN) sends downlink data packets (DDP) to all or at least a subset of the slave nodes (SN1-SN4) during the downlink slot (DS), and each of the slave nodes (SN1-SN4) sends at least one uplink data packet (UDP) to the master node (MN) during its respective uplink slot (US1-US4), wherein the master node (MN) evaluates the uplink data packets (UDP) that were received from the slave nodes (SN1-SN4) during the uplink slots (US1-US4) of the transmission subframe (TSF), and generates a re-transmission schedule (RTS) that defines a re-transmission of uplink and/or downlink data packets (UDP, DDP) in the auxiliary subframe (ASF) in case of an unsuccessful reception of due uplink data packets (UDP) from slave nodes (SN1-SN4) in the respective uplink slot (US1-US4) or in case that uplink data packets (UDP) received from the slave nodes (SN1-SN4) indicate an unsuccessful reception of downlink data packets (DDP) during the previous downlink slot (DS), wherein prior to the first re-transmission of uplink and/or downlink data packets (UDP, DDP) in the auxiliary subframe (ASF), the master node (MN) broadcasts the re-transmission schedule (RTS) to the slave nodes (SN1-SN4), and wherein in case of a successful reception of data packets from the master node (MN) in the downlink slot (DS), each slave node (SN1-SN4) confirms this successful reception in its consecutive uplink slot (US1-US4).

2. Method according to claim 1, characterized in that the master node (MN) broadcasts the re-transmission schedule (RTS) in a control packet (JSP) between the transmission subframe (TSF) and the auxiliary subframe (ASF).

3. Method according to claim 1, characterized in that the re-transmission schedule (RTS) defines at least one slave node (SN1-SN4) that is requested to re-transmit the re-transmission schedule (RTS) or the control packet (JSP) before the beginning of or during the auxiliary subframe (ASF).

4. Method according to claim 1, characterized in that in case of an unsuccessful reception of a downlink data packet (DPP) with respect to any of the slave nodes (SN1-SN4), the re-transmission schedule (RTS) indicates that the master node (MN) itself re-transmits the respective downlink data packet (DPP) to the affected slave node.

5. Method according to claim 1, characterized in that each of the slave nodes (SN1-SN4) store all uplink and downlink data packets (UDP, DDP) that they receive during the transmission subframe, including those data packets that are assigned to other slave nodes (SN1-SN4) or sent from other slave nodes (SN1-SN4) to the master node (MN).

6. Method according to claim 5, characterized in that in case of an unsuccessful reception of a downlink data packet (DPP) with respect to any of the slave nodes (SN1-SN4), the re-transmission schedule (RTS) requests one or more of the other slave nodes to re-transmit the respective stored downlink data packet.

7. Method according to claim 5, characterized in that in case of an unsuccessful reception of an uplink data packet (UDP) with respect to any of the slave nodes (SN1-SN4), the re-transmission schedule (RTS) requests one or more of the other slave nodes to re-transmit the respective stored uplink data packet.

8. Method according to claim 5, characterized in that the selection of said one or more of the other slave nodes that are requested to re-transmit stored data packets, is arbitrary or carried out according to a given selection scheme that is independent of channel quality data.

9. Method according to claim 5, characterized in that the master node (MN) selects said one or more of the other slave nodes that are requested to re-transmit their stored data packets, in dependence of channel quality data.

10. Method according to claim 1, characterized in that in case of an unsuccessful reception during the uplink and downlink slot (DS) with respect to one of the slave nodes (SN1-SN4), hereinafter referred to as affected slave node, the master node (MN) determines at least one of the other slave nodes, hereinafter referred to as elected slave node, that has received and stored the data packets of both the downlink and uplink slot (US1-US4) of the affected slave node, and requests the elected slave node within the re-transmission schedule (RTS) to re-transmit the stored data packets of the respective downlink and uplink slot (US1-US4) of the affected slave node, wherein after reception of the re-transmission schedule (RTS), the elected slave node generates a network-coded data packet based on the data packets of the downlink and uplink slot (US1-US4) of the affected slave node, wherein the network coding is carried out based on a coding scheme that allows decoding the coded data on the basis of the data packet or packets of the uplink slot (US1-US4) as well as on the basis of the data packet or packets of the downlink slot (DS), and wherein the elected slave broadcasts the network-coded data according to the re-transmission schedule (RTS).

11. Communication node configured to be operated in a communication system that comprises a master node (MN) and at least two slave nodes (SN1-SN4), characterized in that the communication node is configured to operate either as master node (MN) or as slave node (SN1-SN4) as defined in claim 1.

12. Method of operating a communication system that comprises a master node (MN) and at least two slave nodes (SN1-SN4) and is operated in a time-division multiplexing technique, wherein the communication is carried out in consecutive time frames, which each comprise at least one transmission subframe (TSF) and at least one auxiliary subframe (ASF) which is scheduled after the transmission subframe (TSF);

wherein the transmission subframe (TSF) comprises at least one downlink slot (DS) for transmission of downlink data packets (DDP) from the master node (MN) to the slave nodes (SN1-SN4), and at least one uplink slot (US1-US4) for transmission of uplink data packets (UDP) from each of the slave nodes (SN1-SN4) to the master node (MN);

wherein the master node (MN) sends downlink data packets (DDP) to all or at least a subset of the slave nodes (SN1-SN4) during the downlink slot (DS), and each of the slave nodes (SN1-SN4) sends at least one uplink data packet (UDP) to the master node (MN) during its respective uplink slot (US1-US4);

wherein the master node (MN) evaluates the uplink data packets (UDP) that were received from the slave nodes (SN1-SN4) during the uplink slots (US1-US4) of the transmission subframe (TSF), and generates a re-transmission schedule (RTS) that defines a re-transmission of uplink and/or downlink data packets (UDP, DDP) in the auxiliary subframe (ASF) in case of an unsuccessful reception of due uplink data packets (UDP) from slave nodes (SN1-SN4) in the respective uplink slot (US1-US4) or in case that uplink data packets (UDP) received from the slave nodes (SN1-SN4) indicate an unsuccessful reception of downlink data packets (DDP) during the previous downlink slot (DS);

wherein prior to the first re-transmission of uplink and/or downlink data packets (UDP, DDP) in the auxiliary subframe (ASF), the master node (MN) broadcasts the re-transmission schedule (RTS) to the slave nodes (SN1-SN4); and wherein characterized in that each of the slave nodes (SN1-SN4) determines channel quality data with respect to data packets received from each of the other slave nodes (SN1-SN4) as well as from the master node (MN), and transmits the quality data to the master node (MN) during its uplink slot (US1-US4).

13. Method according to claim 12, characterized in that
in case of an unsuccessful reception of an uplink data packet (UDP) during an uplink slot (US1-US4) of one of the slave nodes (SN1-SN4), hereinafter referred to as affected uplink slave node, the master node (MN) requests at least one of the other slave nodes, hereinafter referred to as uplink re-transmitting slave node, to re-transmit their respective stored uplink data packet of the affected uplink slave node, wherein the master node (MN) elects the slave node that has the best channel quality data with respect to the reception of data packets by the master node (MN), as the or one of the uplink re-transmitting slave nodes and/or in case of an unsuccessful reception of a downlink data packet (DPP) during the downlink slot (DS) with respect to one of the slave nodes (SN1-SN4), hereinafter referred to as affected downlink slave node, the master node (MN) requests at least one of the other slave nodes, hereinafter referred to as downlink re-transmitting slave node, to re-transmit their stored data packet of the respective downlink slot (DS) of the affected downlink slave node, wherein the master node (MN) elects at least the slave node that has the best channel quality data with respect to the reception of data packets by the affected downlink slave node, as the or one of the downlink re-transmitting slave node.

14. Method according to claim 12, characterized in that
based on one or more previous time frames, the master node (MN) re-arranges the allocation of slave nodes (SN1-SN4) to the uplink slots (US1-US4) in the transmission subframe, wherein slave nodes (SN1-SN4) having better channel quality data with respect to the reception of data packets from the master node (MN) are scheduled after slave nodes (SN1-SN4) with worse channel quality data.

* * * * *

UNITED STATES PATENT AND TRADEMARK OFFICE
CERTIFICATE OF CORRECTION

| | | |
|---|---|---|
| PATENT NO. | : 12,120,663 B2 | Page 1 of 1 |
| APPLICATION NO. | : 17/433432 | |
| DATED | : October 15, 2024 | |
| INVENTOR(S) | : James Gross, Christian Dombrowski and Dominik Chmiel | |

It is certified that error appears in the above-identified patent and that said Letters Patent is hereby corrected as shown below:

On the Title Page

Item (71), should read -- (71) R3 Solutions GmbH --
Item (73), should read -- (73) R3 Solutions GmbH --

Signed and Sealed this
Twenty-third Day of December, 2025

John A. Squires
*Director of the United States Patent and Trademark Office*